(12) United States Patent
Castinado et al.

(10) Patent No.: US 8,538,873 B1
(45) Date of Patent: Sep. 17, 2013

(54) COMMUNICATION NETWORK FOR GATHERING INFORMATION AND PERFORMING ELECTRONIC TRANSACTIONS

(75) Inventors: Joseph B. Castinado, Northglenn, CO (US); Gregory G. Farr, Charlotte, NC (US); Jo-Anne E. Rivet, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/563,210

(22) Filed: Jul. 31, 2012

Related U.S. Application Data

(60) Provisional application No. 61/660,363, filed on Jun. 15, 2012.

(51) Int. Cl.
*G06Q 40/00* (2012.01)

(52) U.S. Cl.
USPC .......................................................... 705/39

(58) Field of Classification Search
CPC ...................................................... G06Q 20/10
USPC .......................................................... 705/39
See application file for complete search history.

(56) References Cited

U.S. PATENT DOCUMENTS

| | | | |
|---|---|---|---|
| 7,103,640 B1 | 9/2006 | Overton et al. | |
| 7,194,437 B1 | 3/2007 | Britto et al. | |
| 7,653,591 B1 | 1/2010 | Dabney | |
| 7,685,067 B1 | 3/2010 | Britto et al. | |
| 7,925,586 B2 | 4/2011 | Cole et al. | |
| 2002/0077971 A1 | 6/2002 | Allred | |
| 2004/0098335 A1* | 5/2004 | Michelsen et al. | 705/39 |
| 2007/0124242 A1 | 5/2007 | Reis | |
| 2009/0157520 A1 | 6/2009 | Algiene et al. | |
| 2009/0164352 A1 | 6/2009 | Sorbe et al. | |
| 2011/0055077 A1 | 3/2011 | French et al. | |
| 2011/0246358 A1* | 10/2011 | Blackhurst et al. | 705/39 |

OTHER PUBLICATIONS http://www.moneysupermarket.com/current-accounts/international-money-transfer/, © Moneysupermarket.com Ltd. 2012, 2 pages.
https://wumt.westernunion.com/WUCOMWEB/priceShopper RedirectAction.do?method=load&countryCode=US&languageCode=en, © 2001-2012 Western Union Holdings Inc., 1 page.
https://moneybookers.com/p2p/en/calculator/fees.pl, © Moneybookers Ltd., Date unknown, printed Jul. 10, 2012 (Electronic Commerce (EC Directive) Regulations 2002 & Consumer Protection (Distance Selling) Regulations 2000 Notices).

* cited by examiner

*Primary Examiner* — Eric T Wong
(74) *Attorney, Agent, or Firm* — Michael Springs

(57) ABSTRACT

In certain embodiments, a system for calculating a cost for an electronic transaction comprises one or more processors operable to receive first charge information associated with electronic transactions for a plurality of nodes, one or more memories operable to store the first charge information, the one or more processors further operable to receive a request execute an electronic transaction, determine a route for the electronic transaction comprising two or more of the nodes, determine first charge information applicable to the electronic transaction for the two or more nodes, and calculate a cost for the electronic transaction based at least in part on the first charge information for the two or more nodes on the route.

19 Claims, 11 Drawing Sheets

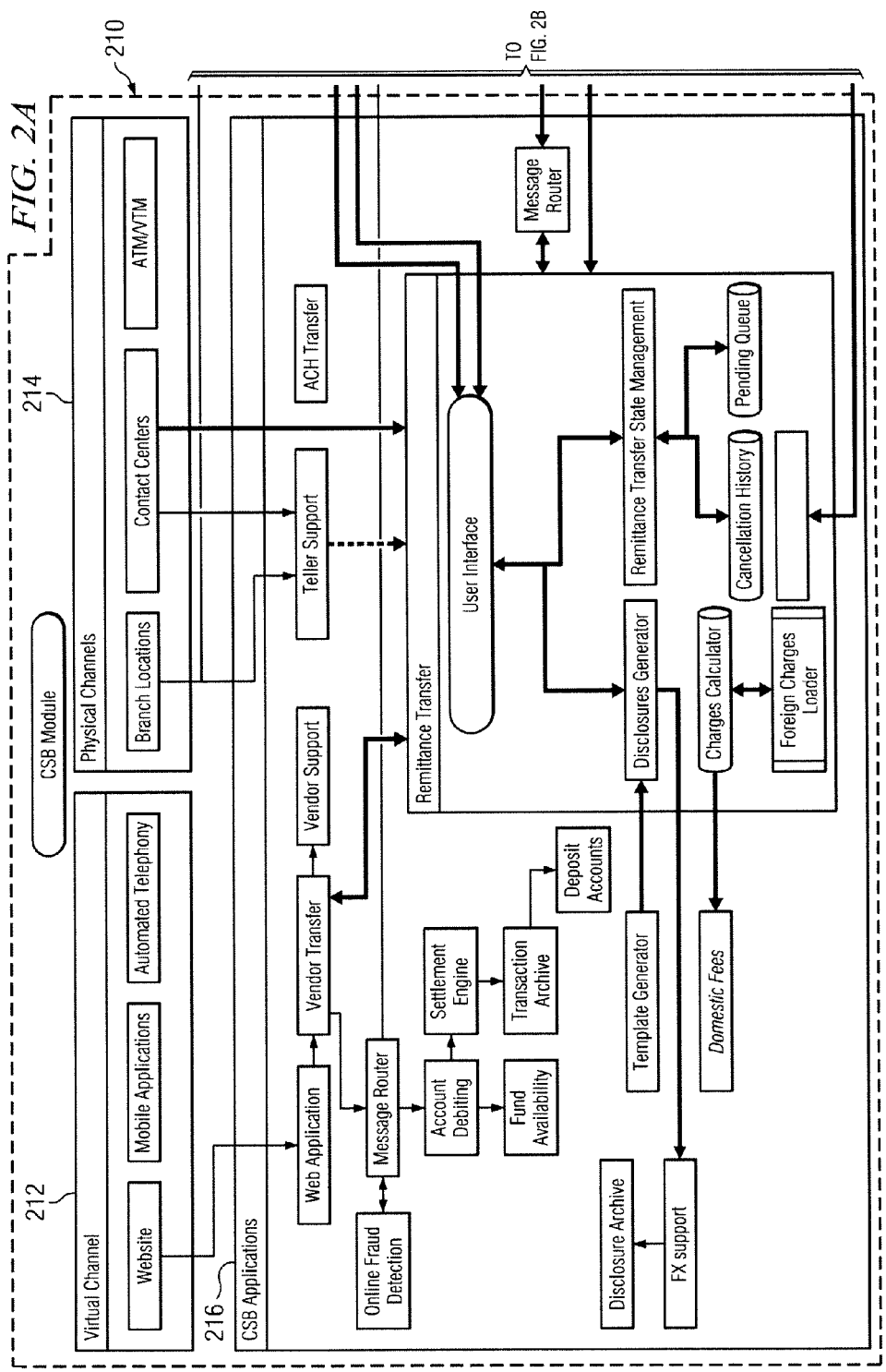

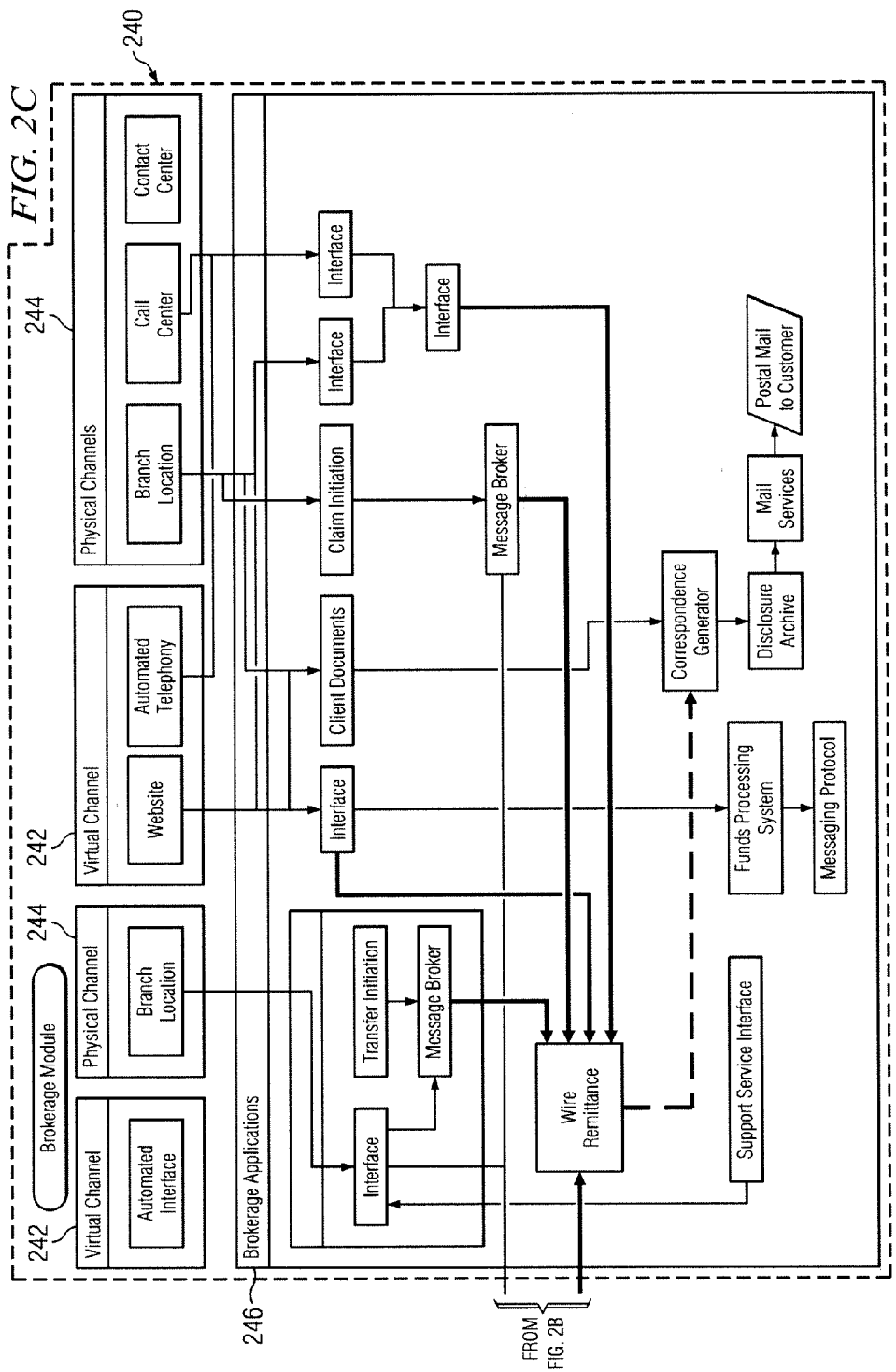

```
                                                    600
                                                     ↓
        BANK                          Today's Date: January 1, 2015
        RECEIPT
        123 Main St.
        City, State 00000-0000

602 ——— SENDER:                  604 ——— RECIPIENT:
        First Last                       First Last
        111 Grand Ave                    222 1st St
        City, State 11111-1111           City, Country
        555-555-1234                     555-555-5678

606 ——— PICK-UP LOCATION:
        FOREIGN BANK
        1234 Rue
        City, Country 608 ——— Confirmation Code:    ABC 123 DEF 456
        610 ——— Date Available        January 2, 2015

------------------------------------------------------------

612 ——— Transaction Amount ................................  $100.00

614 ——— Transferor Node Charges ..........................  + $7.00

616 ——— Transfer Entity Charges ..........................  + $3.00

------------------------------------------------------------

618 ——— Total .............................................  $110.00

------------------------------------------------------------

620 ——— Exchange Rate: $1.00 USD     -     12.34 XXN

------------------------------------------------------------

622 ——— Transaction Amount ..............................  1,234.00 XXN

624 ——— Other Node Charges ..............................    - 49.00 XXN

626 ——— Other Entity Charges ............................    - 12.00 XXN

628 ——— Total to Recipient ..............................  1,173.00 XXN

| | TRANSACTION ID 702 | TRANSACTION AMOUNT ($USD) 704 | TRANSACTION DESTINATION 706 | BANK ID 708 | BANK LOCATION (COUNTRY) 710 | BANK ID CHARGE 712 | BANK CHARGE AMOUNT ($USD) 714 | BANK CHARGE RATING 716 | COUNTRY ID CHARGE 718 | COUNTRY CHARGE 720 | COUNTRY CHARGE RATING 722 |
|---|---|---|---|---|---|---|---|---|---|---|---|
| 724 | 01-AB-23-CD | $100.00 | NICE, FRANCE | ABC123 | FRANCE | YZ-6789 | $3.00 | NORMAL | 5R7V | $0.50 | HIGH |
| 726 | 01-AB-23-CD | $100.00 | NICE, FRANCE | DEF456 | FRANCE | GH-7654 | $1.00 | LOW | 5R7V | $0.50 | HIGH |
| 728 | 67-OP-89-QR | $500.00 | BEIJING, CHINA | GHI789 | CANADA | QR-4321 | $2.00 | HIGH | 3P1A | $0.75 | NORMAL |
| 730 | 67-OP-89-QR | $500.00 | BEIJING, CHINA | JKL321 | CHINA | ST-2468 | $5.00 | NO CONFIDENCE | 2G6B | $1.00 | LOW |

700

COMMUNICATION NETWORK FOR GATHERING INFORMATION AND PERFORMING ELECTRONIC TRANSACTIONS

TECHNICAL FIELD OF THE INVENTION

This invention relates generally to a communication network for gathering information and performing electronic transactions.

BACKGROUND OF THE INVENTION

Electronic communications often involve a number of different nodes. Each node involved in the transaction may apply a charge for servicing the electronic transaction. Additionally, each node may have different charges for particular electronic transactions that result in different charges from each node for similar electronic transactions. In certain instances, some nodes may not share their charge information with other nodes.

An electronic transaction may involve nodes under the authority of several different entities. Each entity involved in the electronic transaction may apply a charge for the electronic transaction. Each entity may have different charges that apply to electronic transactions and similar electronic transactions may be charged differently by different entities involved in the transaction. In some instances, a node may apply a charge on behalf of an entity. In certain situations, charge information relating to electronic transactions may be not be easily accessible for nodes, for example, because the information is disbursed across a large number of different organizations, enterprises, businesses, agencies, and other bodies.

A node initiating an electronic transaction may not be able to determine the charges that will be applied to the transaction by other nodes or entities involved in the transaction. As an example, a node may initiate an electronic transaction representing a currency value. Other nodes and entities involved in the transaction may apply charges to the transaction and reduce the currency value represented in the transaction. The initiating node may not be able to determine the currency amount that will be available at the end of the transaction once all the nodes involved in the transaction and all the entities involved in the transaction reduce the currency value of the transaction by applying their respective charges. Accordingly, the initiating node may not be able to determine the cost of an electronic transaction until after the transaction is executed.

SUMMARY OF THE INVENTION

According to embodiments of the present disclosure, disadvantages and problems associated with executing electronic transactions may be reduced or eliminated.

In certain embodiments, a system for calculating a cost for an electronic transaction comprises one or more processors operable to receive first charge information associated with electronic transactions for a plurality of nodes, one or more memories operable to store the first charge information, the one or more processors further operable to receive a request execute an electronic transaction, determine a route for the electronic transaction comprising two or more of the nodes, determine first charge information applicable to the electronic transaction for the two or more nodes, and calculate a cost for the electronic transaction based at least in part on the first charge information for the two or more nodes on the route.

Certain embodiments of the present disclosure may provide some, none, or all of the following technical advantages having specific technical effects.

In certain embodiments, nodes involved in electronic transactions can determine costs associated with an electronic transaction before executing the transaction, thereby conserving the computational resources and bandwidth consumed by determining costs associated with transactions by executing and storing the results of numerous transactions.

In another embodiment, nodes involved in electronic transactions can obtain charge information associated with electronic transactions for a plurality of nodes and store the charge information in a centralized database before receiving a request to execute an electronic transaction, thereby reducing the computation resources and bandwidth consumed by attempting to obtain charge information from remote sources through a burst of requests after receiving a request to execute an electronic transaction.

In yet another embodiment, nodes involved in electronic transactions can reduce transaction time associated with an electronic transaction by routing the transaction through nodes with the lowest transaction time, thereby reducing the computational resources and bandwidth consumed routing the transaction through nodes with longer transaction times.

In still yet another embodiment, nodes involved in electronic transactions can increase the efficiency of the electronic transaction by routing the transaction on a route with the least number of nodes, thereby conserving the bandwidth and computational resources consumed by routes using more nodes.

In another embodiment, nodes involved in electronic transactions can increase the efficiency of the electronic transaction by routing the transaction on a route with lowest transaction cost, thereby conserving the bandwidth and computational resources consumed by attempting transactions to determine their cost.

In yet another embodiment, nodes involved in electronic transactions can increase the efficiency of electronic transactions by maintaining updated charge information for nodes in order to avoid routing the transaction through nodes with inaccurate charge information, thereby conserving the computational resources and bandwidth consumed reconciling inaccuracies after a transaction has occurred (e.g., through customer service claims investigation).

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 2A-C are block diagrams illustrating an embodiment of a system for determining charges associated with electronic transactions and executing electronic transactions;

FIG. 6 illustrates an embodiment of receipt of charges associated with an electronic transaction;

FIG. 7 is a table illustrating an embodiment of database fields that may be used in determining charges associated with electronic transactions.

DETAILED DESCRIPTION OF THE INVENTION

Embodiments of the present invention and its advantages are best understood by referring to FIGS. 1 through 8 of the drawings, like numerals being used for like and corresponding parts of the various drawings.

In an embodiment of operation of the present disclosure, one or more of components obtain information associated with nodes or entities involved in electronic transactions in order to create a centralized repository of transaction information. A rating is generated for transaction information based on various qualities of the transaction information. The ratings are used to maintain updated and accurate transaction information. Transaction information and associated ratings are stored in one or more memories to create a centralized repository of transaction information so that transaction information relating to a particular electronic transaction (e.g., transaction information relating to nodes or entities involved in a specific transaction) can be quickly identified. Interfaces receive requests for transaction information or for calculations based on transaction information.

One or more processors provide transaction information responsive to the requests and perform calculations based on the transaction information. The processors may reduce transaction time to execute an electronic transaction by providing real-time charge information for an electronic transaction before executing the transaction, may increase the efficiency of electronic transactions by determining electronic transaction routes through nodes or entities with the lowest charges, may increase the efficiency of electronic transactions by determining transaction routes through nodes or entities with the fastest transaction time, or other useful operation using transaction data to facilitate electronic transactions.

Figure 1:
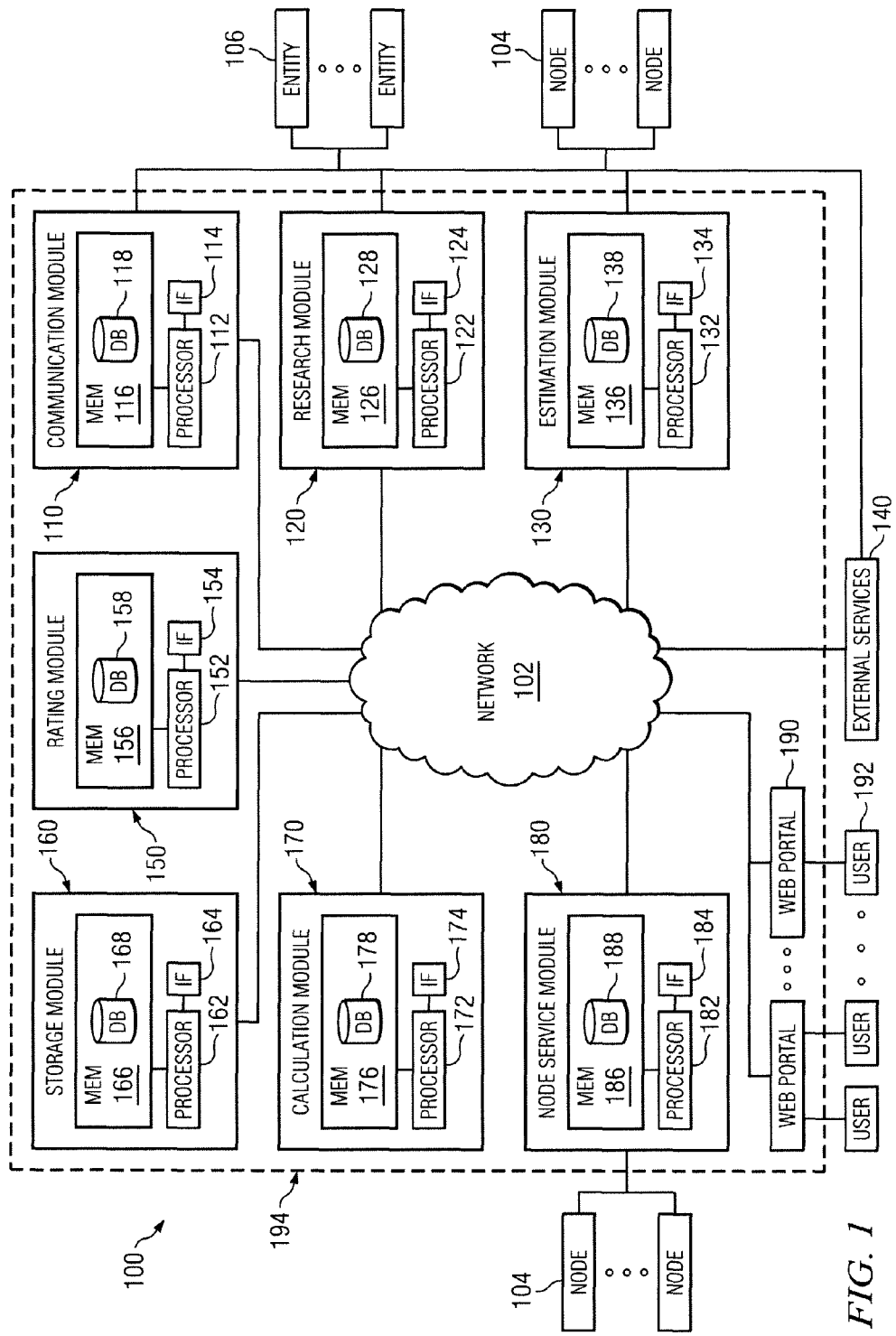
FIG. 1 is a block diagram illustrating an embodiment of a system for determining charges associated with electronic transactions.

FIG. 1 is a block diagram illustrating an embodiment of a system for determining charges associated with electronic transactions. According to an embodiment, system 100 includes network 102, nodes 104, entities 106, communication module 110, research module 120, estimation module 130, external service providers 140, rating module 150, storage module 160, calculation module 170, node service module 180, web portal 190, users 192, and enterprise 194.

Network 102 represents any suitable network operable to facilitate communication between components of system 100, such as nodes 104, entities 106, communication module 110, research module 120, estimation module 130, external service providers 140, rating module 150, storage module 160, calculation module 170, node service module 180, web portal 190, users 192, and enterprise 194. Network 102 may include any interconnecting system capable of transmitting audio, video, electrical signals, optical signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

Nodes 104 represent components through which electronic transactions are routed. Electronic transactions may include any form of commercial transaction executed electronically. In certain embodiments, electronic transactions represent currency values being transferred between nodes 104, for example fund transfers. Nodes 104 may include organizations such as commercial banks, savings and loan associations, credit unions, internet banks, mutual fund companies, brokerage firms, credit card companies, or other provider of electronic transaction services. In certain embodiments, nodes 104 apply charges for servicing electronic transactions. Some nodes 104 may have different charges than other nodes 104 for similar electronic transactions.

In particular embodiments, nodes 104 are under the authority of different entities 106. Entities 106 represent any body with authority over nodes 104. In certain embodiments, entities 106 include enterprises, trade associations, governments, government agencies, countries, or other body that may have authority over nodes 104. Entities 106 may have charges that apply to electronic transactions and different entities 106 may have different charges for similar electronic transactions. In certain embodiments, a node 104 may apply a charge for another node 104 or for an entity 106. Nodes 104 and entities 106 may have distribution channels for communicating charge information, such as publications, official communications, official websites, official points of contact, or other suitable channel.

In certain embodiments, nodes 104 need to provide notification of the cost of an electronic transaction before executing the electronic transaction. The cost of an electronic transaction may include costs such as charges applied by nodes 104 involved in the transaction and charges applied by entities 106 with authority over the nodes 104 involved in the electronic transaction. In certain embodiments, some nodes 104 may not have access to the necessary information to determine the cost of an electronic transaction before executing the transaction and may request this information from other sources.

Communication module 110 represents a component operable to interface with nodes 104 or entities 106 to receive information related to charges applied by nodes 104 for servicing electronic transactions or charges applied by entities 106 for electronic transactions. Communication module 110 may include processor 112, interface 114, memory 116, and database 118. In certain embodiments, communication module 110 interfaces directly with nodes 104 or entities 106. Nodes 104 or entities 106 may provide communication module 110 with charge information related to charges applied by nodes 104 or entities 106. Communication module 110 may also communicate requests to nodes 104 or entities 106 requesting charge information. In certain embodiments, communication module 110 may receive or request charge information from nodes 104 or entities 106 if new information becomes available, if there is an error in an electronic transaction, according to a schedule, or any other suitable trigger. Communication module 110 may be entirely or partially automated.

Communication module 110 may receive charge information through any suitable messaging format or communication protocol. In certain embodiments, the formats or protocols may be proprietary or industry standards, such as SWIFT. Communication module 110 may communicate charge information to other components of system 100, for example, rating module 150, storage module 160, calculation module 170, or any other component of system 100.

Research module 120 represents a component operable to determine information related to charges applied by nodes 104 or entities 106 for electronic transactions. Research module 120 may include processor 122, interface 124, memory 126, and database 128. In certain embodiments, research module 120 researches charges for electronic transactions using automated processes, partially automated processes, or receives information relating to charges as inputs from users. For example, research module 120 may automatically gather information about charges related to electronic transactions. In another example, research module 120 may rely wholly or partially on input from users who manually gather information about charges related to electronic transactions.

In certain embodiments, research module 120 may obtain charge information from sources such as: websites, publications, electronic transaction records (e.g., historical records of electronic transactions), surveys, service information (e.g., claims of problems with an electronic transaction), nodes 104, entities 106, researchers conducting manual searches, researchers directly contacting nodes 104 or entities 106, or any other available information. Research module 120 may communicate charge information to other components of system 100, for example, rating module 150, storage module 160, calculation module 170, or any other component of system 100.

Estimation module 130 represents a component operable to estimate charges applied by nodes 104 or entities 106 for electronic transactions. Estimation module 130 may include processor 132, interface 134, memory 136, and database 138. In certain embodiments, if charge information cannot be obtained directly from a node 104 or entity 106 and is not found by researching available information, estimation module 106 generates, or receives, an estimated charge for a particular node 104 or entity 106. Estimation module 106 may utilize information such as transaction records involving nodes 104 or entities 106, user inputs, or other any other information to estimate charges for electronic transactions.

Estimation module 130 may generate estimated charges for electronic transactions using automated processes, partially automated processes, or may receive estimated charges as user inputs. For example, estimation module 130 may automatically gather information about charges related to electronic transactions and automatically generate estimates based on this information. In another example, estimation module 130 may rely wholly or partially on user inputs to generate estimated charges. Estimation module 130 may communicate charge information to other components of system 100, for example, rating module 150, storage module 160, calculation module 170, or any other component of system 100.

External service providers 140 represent organizations that collect charge information relating to electronic transactions and provide the charge information as a service. External service providers 140 may have relationships with nodes 104 or entities 106 or other resources that allow external service providers 140 to obtain charge information relating to electronic transactions. In certain embodiments, external service providers 140 may include nodes 104. System 100 may request information from external service providers 140 to supplement the information obtained through communication module 110, research module 120, or estimation module 130. System 100 may receive charge information relating to electronic transactions through any suitable communication method, protocol, or message. External service providers 140 may communicate charge information to other components of system 100, for example, rating module 150, storage module 160, calculation module 170, or any other component of system 100.

Rating module 150 represents a component operable to determine a rating for charge information relating to electronic transactions. Rating module 150 may include processor 152, interface 154, memory 156, and database 158. Ratings may relate to the charge information, the reliability of the charge information, the source of the charge information, the age of the charge information, the lifetime of the charge information, the nodes 104 or entities 106 associated with the charge information, or any other useful criteria. In certain embodiments, ratings module 150 normalizes ratings for different nodes 104 or entities 106. Rating module 150 may receive charge information from components of system 100, such as communication module 110, research module 120, estimation module 130, external service providers 140, or any other component of system 100.

In certain embodiments, ratings reflect the reliability or accuracy of the charge information. For example, information received directly from a node 104 or entity 106, such as through communication module 110, may have a "normal" rating, information received by researching a node 104 or entity 106, such as through research module 120, may have a "low" rating, and estimated information about a node 104 or entity 106 may have a "no confidence" rating. Ratings may be used to nodes 104 to include in electronic transactions. For example, system 100 may remove nodes 104 or entities 106 from a pool of nodes 104 or entities 106 to include in electronic transactions if the nodes 104 or entities 106 have one or more ratings below a particular threshold (e.g., with ratings of "low" or "no confidence"). In certain embodiments, system 100 contacts nodes 104 or entities 106 with one or more poor ratings, for example, to obtain more accurate information.

In certain embodiments, rating module 150 receives charge information relating to a node 104 or entity 106 that reflects a change from stored information about the node 104 or entity 106. Rating module 150 may determine the difference between the new and stored information and determine whether the change is within a particular tolerance level. In certain embodiments, changes greater than a tolerance level are indicators that the new charge information is inaccurate. Tolerance levels may be associated with a charge, a class of charges, a node 104 or entity 106, a class of nodes 104 or entities 106, or any other suitable category. For example, rating module 150 may have a tolerance of 10% change for new charge information associated with a node 104 or entity 106. If rating module 150 determines that a change in charge information reflects a change of greater than 10% from the stored charge, rating module 150 may take action, such as flagging the new information for review, disregarding the new information, attempting to verify the new information, or taking other suitable action.

Rating module 150 may further be operable to update ratings. In certain embodiments, rating module 150 has access to electronic transaction records involving the nodes 104. Electronic transaction records may include information such as the type of transaction, currency values represented by the transaction, nodes 104 involved in the transaction, entities 106 involved in the transaction, persons involved in the transaction, charges applied by nodes 104, charges applied by entities 106, transaction time (e.g., the amount of time it took to execute the transaction) for one or more nodes 104 involved in the transaction, service records (e.g., claims of errors in transactions), or any other suitable information relating to one or more electronic transactions. In an embodiment, rating module 150 can use electronic transaction records to evaluate the accuracy of the charge information. Rating module 150 may use criteria to compare existing charge information to data, such as electronic transaction records, to determine whether to update a rating for the charge information.

In certain embodiments, rating module 150 changes the rating for charge information based on the transaction records. Rating module 150 may have thresholds for updating ratings. For example, if charge information deviates more than 15% from the transaction records the charge information has a "no confidence" rating, if the charge information deviates between 10-15% from the transaction records it has a "low" rating, if the charge information deviates between 5-10% from the transaction records it has a "medium" rating, and if the charge information deviates between 0-5% it has a "high" rating. A method for updating charge information and updating ratings for charge information is described below with respect to FIG. 8.

Storage module 160 represents a component operable to store information for system 100. Storage module 160 may include processor 162, interface 164, memory 166, and database 168. Storage module 160 may receive information from components of system 100, such as communication module 110, research module 120, estimation module 130, external service providers 140, or any other component of system 100. Storage module 160 may receive and store any type of information for system 100, for example, electronic transaction records, charge information, charge information ratings, currency exchange rate information, effective dates for charge information (e.g., dates after which the information becomes valid), expiration dates for charge information (e.g., dates after which the information becomes invalid), transaction times for electronic transactions involving nodes 104, service records (e.g., claims of errors in transactions), or any other suitable information. An example of a table of information that may be stored in storage module 160 is described below with respect to FIG. 7. By storing transaction information relating to a plurality of nodes 104 and/or entities 106 in a centralized repository in advance of receiving specific electronic transaction requests, system 100 can conserve computing resources and bandwidth consumed by attempting to acquire transaction information relating to specific nodes 104 or entities 106 through a burst of requests only after receiving an electronic transaction requests.

Calculation module 170 represents a component operable to perform operations and calculations based on stored information. Calculation module 170 may include processor 172, interface 174, memory 176, and database 178. In an embodiment, calculation module 170 may receive nodes 104 or entities 106 involved in an electronic transaction and associate charge information and charge ratings stored in storage module 160 with the nodes 104 or entities 106 on the electronic transaction route. Calculation module 170 may calculate a cost associated with an electronic transaction based on the nodes 104 or entities 106 involved in the electronic transaction.

In certain embodiments, calculation module 170 receives calculation requests to perform one or more calculations related to an electronic transaction. Calculation module 170 may receive requests from components of system 100, such as node service module 180 or web portals 190, and may access information related to electronic transactions from storage module 160. Requests may include a request for charge information for one or more nodes 104 or entities 106, a request to calculate the charges for a particular electronic transaction, a request to determine particular nodes 104 or entities 106 to include in an electronic transaction based on received criteria (e.g., fastest transaction time or lowest transaction cost), or other request.

In certain embodiments, calculation module 170 may access information from storage module 160 to determine one or more charges related to an electronic transaction. For example, calculation module 170 may receive a calculation request to determine the charges associated with an electronic transaction, access the corresponding charge information from storage module 160, and calculate the charges for the transaction, then respond by communicating the charges for the transaction to the requesting entity. Calculation module 170 may also receive other calculation requests, such as to determine a route for an electronic transaction with the lowest charges, determine a route for an electronic transaction with the lowest number of nodes, determine a route for an electronic transaction with the shortest transaction time, determine exchange rates for currency amounts represented by the electronic transaction, or any other request. Calculation module 170 may respond to calculation requests with requested information. In certain embodiments, calculation module 170 generates reports (e.g., receipts, prepayment reports, or other useful report) based on the requested information and includes the reports in responses to calculation requests.

Node service module 180 represents a component operable to receive information or calculation requests from nodes 104. Node service module 180 may include processor 182, interface 184, memory 186, and database 188. In certain embodiments, nodes 104 need to determine charges associated with an electronic transaction before executing the transaction. For example, nodes 104 may need to provide notice of charges associated with an electronic transaction before executing the transaction (e.g., because of applicable government regulations). Nodes 104 may not have access to the necessary information to determine the charges associated with the electronic transaction (e.g., because the nodes 104 lack the resources or relationships to obtain the information) and may request the information from system 100. Nodes 104 may request any type of information such as charge information, calculation requests for specific electronic transactions, or any other request. Node service module 180 may communicate requests to components, such as calculation module 170, storage module 160, rating module 150, or other component of system 100.

Web portal 190 represents a component operable to provide an interface between system 100 and users 192. Users 192 may include nodes 104, entities 106, businesses or other commercial organizations, government agencies, individuals, or any other suitable user. In certain embodiments, web portal 190 is an interne, or intranet, site that provides access to the information (e.g., information in storage module 160) and services (e.g., the functions of calculation module 170) of system 100.

Enterprise 194 represents an organization that operates system 100. In an embodiment, enterprise 194 includes network 102, communication module 110, research module 120, estimation module 130, rating module 150, storage module 160, calculation module 170, node service module 180, and web portals 190. Enterprise 194 may refer to a node 104, however, enterprise 194 represents any suitable type of entity. Enterprise 194 may have different business units, or subdivisions that handle different business activities.

A module (e.g., modules 110, 120, 130, 150, 160, 170, and 180) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as communication module 110, research module 120, estimation module 130, rating module 150, storage module 160, calculation module 170, and node service module 180, may include one or more processors. A processor represents any computing device, such as processors 112, 122, 132, 152, 162, 172, and 182, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., modules 110, 120, 130, 150, 160, 170, and 180), an interface (e.g., interfaces 114, 124, 134, 154, 164, 174, and 184), a memory (e.g., memories 116, 126, 136, 156, 166, 176, and 186), a database (e.g., databases 118, 128, 138, 158, 168, 178, and 188), or any other suitable component.

An interface represents any device, such as interfaces 114, 124, 134, 154, 164, 174, and 184, operable to receive input, send output, process the input or output, or perform other suitable operations for a component of system 100. An interface includes any port or connection, real or virtual, including any suitable hardware or software, including protocol conversion and data processing capabilities, to communicate through network 102. In certain embodiments, an interface includes a user interface (e.g., physical input, graphical user interface, touchscreen, buttons, switches, transducer, or any other suitable method to receive input from a user).

A memory represents any device, such as memories 116, 126, 136, 156, 166, 176, and 186, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., databases 118, 128, 138, 158, 168, 178, and 188).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

In an embodiment of operation of system 100, one or more of communication module 110, research module 120, estimation module 130, and external service providers 140 obtain information for nodes 104 or entities 106 relating to electronic transactions in order to create a centralized repository of transaction information. Transaction information may include charges for nodes 104 for electronic transactions, charges for entities 106 for electronic transactions, transaction times for nodes 104 or entities 106, transaction records, or other information. After obtaining information relating to electronic transactions, communication module 110, research module 120, estimation module 130, and external service providers 140 may communicate the information to other components of system 100, such as rating module 150.

Rating module 150 receives the transaction information and determines a rating for the transaction information so that system 100 can sort the transaction information based on one or more qualities of the transaction information. Ratings may be based on the transaction information, the reliability of the transaction information, the accuracy of the transaction information, the source of the transaction information, the age of the transaction information, an expiration or effective date for the transaction information, the nodes 104 or entities 106 associated with the transaction information, or any other useful criteria. Ratings module 160 communicates ratings to other components of system 100, such as storage module 160.

Storage module 160 stores transaction information and the corresponding ratings to create a centralized repository of transaction information associated with nodes 104 and entities 106 so that transaction information relating to a particular electronic transaction (e.g., transaction information relating to nodes 104 or entities 106 involved in a specific transaction) can be quickly identified. Interfaces, such as node service module 180 and web portals 190, receive requests for transaction information or requests to obtain calculations based on transaction information, and communicate requests to components of system 100, such as calculation module 170. Requests may include requests for information relating to a node 104, an entity 106, charges, calculations of charges for particular electronic transactions, requests to determine transaction routes based on criteria (e.g., determine a route for a transaction with the lowest charges or determine a route for a fund transfer with the fastest transaction time), or other request. Node service module 180 and web portals 190 communicate requests to calculation module 170.

Calculation module 170 receives requests and performs calculations based on the information in storage module 160. In an embodiment, calculation module 170 reduces transaction time to execute an electronic transaction by providing real-time charge information (e.g., charges for a transaction from nodes 104 or entities 106 involved in the transaction) for an electronic transaction before executing the transaction. In another embodiment, calculation module 170 increases the efficiency of electronic transactions by determining electronic transaction routes through nodes 104 or entities 106 with the lowest charges. In yet another embodiment, calculation module 170 increases the efficiency of electronic transactions by determining transaction routes through nodes 104 or entities 106 with the fastest transaction time. Calculation module 170 may perform any suitable operation using transaction data to facilitate electronic transactions.

Modifications, additions, or omissions may be made to system 100. System 100 may include more, fewer, or other components. Any suitable component of system 100 may include a processor, interface, logic, memory, or other suitable element. System 100 may be operable to determine any type of charge associated with any type of electronic transaction.

Figure 2B:
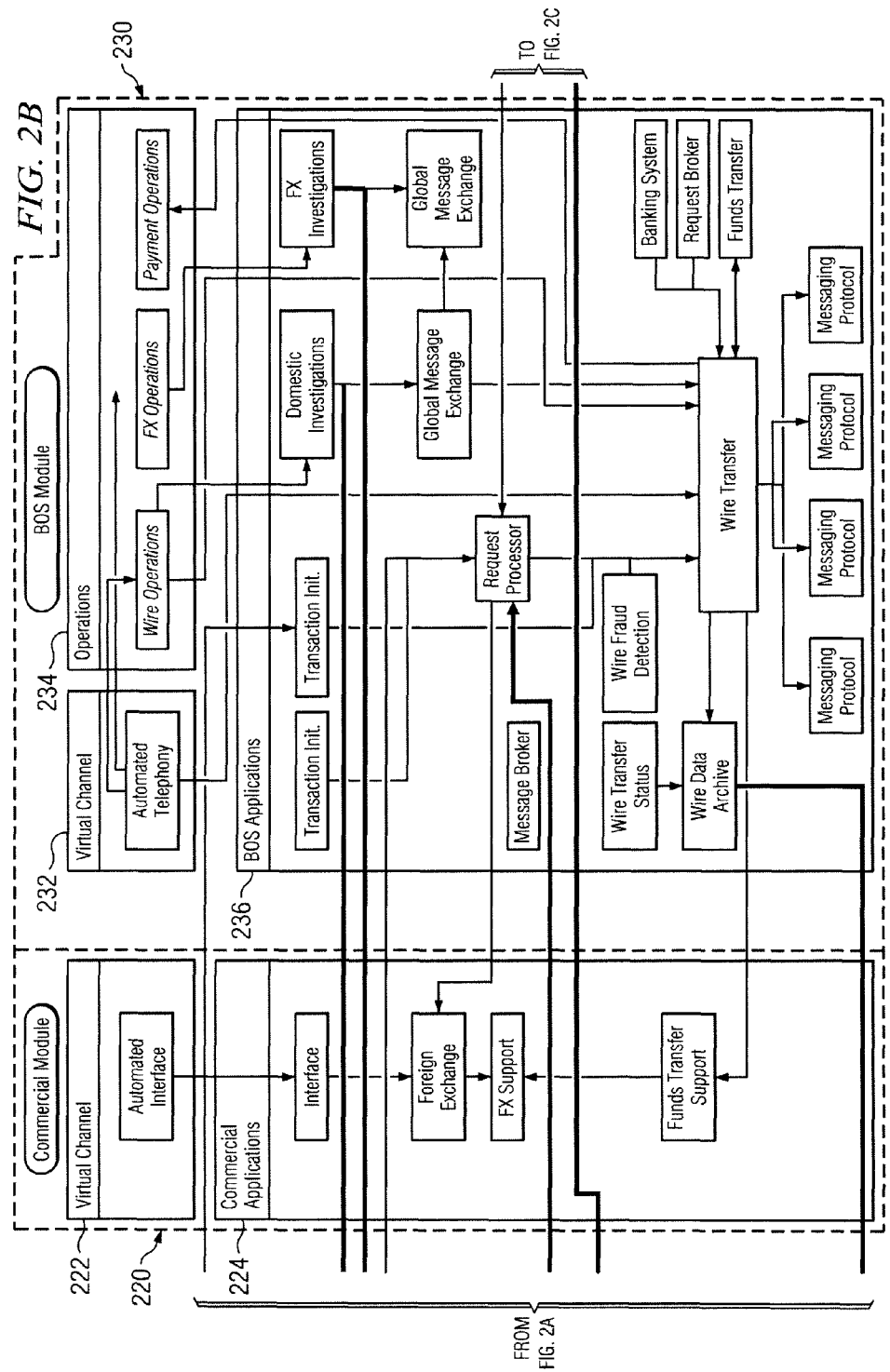

FIGS. 2A-C are block diagrams illustrating embodiment of a system for determining charges associated with electronic transactions and executing electronic transactions. System 200 includes consumer/small business ("CSB") module 210, commercial module 220, back office systems ("BOS") module 230, and brokerage module 240.

CSB module 210 represents a component of system 200 operable to provide electronic transaction services for individual consumers and small businesses. CSB module 210 includes virtual channels 212, physical channels 214, and CSB applications 216. Virtual channels 212 represent automated interfaces through which users can access the services CSB module 210. Virtual channels 212 include websites, mobile applications (e.g., mobile web access, mobile applications, etc), voice recognition telephony (e.g., voice recognition call centers), or any other suitable automated interface through which users can access services. Physical channels 214 represent manual interfaces through which users can access the services of CSB module 210. Physical channels 214 include branch locations (e.g., brick and mortar operations), call centers, automated teller machines (ATMs), virtual teller machines (VTMs), or any other suitable manual interface through which users can access services.

CSB applications 216 represent components of CSB module that provide particular functionalities of CSB module 210. For example CSB applications may provide one or more of the following functions: web services, vendor electronic transaction services, vendor electronic transaction support, teller support, automated clearing house (ACH) fund transferring, online fraud detection, message routing, account debiting, remittance settlement, fund accessibility, transaction record archiving, deposit account (e.g., checking or savings accounts) accessibility, transaction disclosure statement archiving, disclosure statement template generation, exchange rate support, domestic transaction charge archiving, message routing, user interfacing, transaction disclosure generation, remittance transaction management, transaction charge calculation, caching, foreign transaction charge archiving, transaction cancellation record archiving, transaction route generation, legal/regulatory compliance, or any other suitable functionality.

Commercial module 220 represents a component of system 200 operable to provide electronic transaction services for nodes 104. Commercial module 220 includes virtual channels 222 and commercial applications 224. Virtual channels 222 may include automated interfaces with nodes 104. Commercial applications 226 represent components of commercial module 220 that provide particular functionalities of commercial module 220. For example, commercial applications 226 may provide one or more of the following functions: user interfacing, exchange rate determination, exchange rate support, transaction support, legal/regulatory compliance, or any other suitable functionality.

BOS module 230 represents a component of system 200 operable to provide back office services for electronic transactions. BOS module 230 includes virtual channels 232, operations 234, and BOS applications 236. Virtual channels 232 represent automated interfaces through which users can access the services BOS module 230. Virtual channels 232 may include automated interfaces such as websites, mobile device interfaces, voice recognition telephony, or other suitable automated interface. Operations 234 represent electronic transaction mechanisms. Operations 234 include wire transfer operations, foreign exchange operations, and payment operations. Wire transfer operations facilitate electronic transactions through wire services. Foreign exchange operations facilitate international electronic transactions. Payment operations facilitate the movement of funds for electronic transactions.

BOS applications 236 represent components of BOS module 230 that provide particular functionalities of BOS module 230. For example, BOS applications 236 may provide one or more of the following services: electronic transaction initiation, branch location services, domestic transaction claim (e.g., customer complaints about fund transfers) investigation, international transaction claim investigation, transaction record archiving, transaction request processing, message brokering, transaction record analysis, transaction status reporting, transaction fraud detection, transaction execution, messaging protocol conversion, banking support, electronic transaction request reception, legal/regulatory compliance, or any other suitable functionality.

Brokerage module 240 represents a component of system 200 operable to provide electronic transaction services for investment brokerages. Brokerage module 240 includes virtual channels 242, physical channels 244, and brokerage applications 246. Virtual channels 242 represent automated interfaces through which users can access the services of brokerage module 240. Virtual channels 242 may include automated interfaces such as websites, mobile device interfaces, voice recognition telephony, or other suitable automated interface. Physical channels 244 represent manual interfaces through which users can access the services of brokerage module 240. Physical channels 244 include brokerage centers (e.g., a brick and mortar locations), call centers, or any other suitable manual interface through which users can access services.

Brokerage applications 246 represent components of brokerage module 240 that provide particular functionalities of brokerage module 240. For example CSB applications 246 may provide one or more of the following functions: user interfacing, transaction initiation, message brokering, support service interfacing, transaction disclosure archiving, correspondence generation, correspondence mailing, client document archiving, transaction claim (e.g., service complaint regarding a transaction) initiation, transaction management and tracking, messaging protocol conversion, electronic transaction execution, legal/regulatory compliance, or any other suitable functionality.

Modifications, additions, or omissions may be made to system 200. System 200 may include more, fewer, or other components. Any suitable component of system 200 may include a processor, interface, logic, memory, or other suitable element.

Figure 3A:
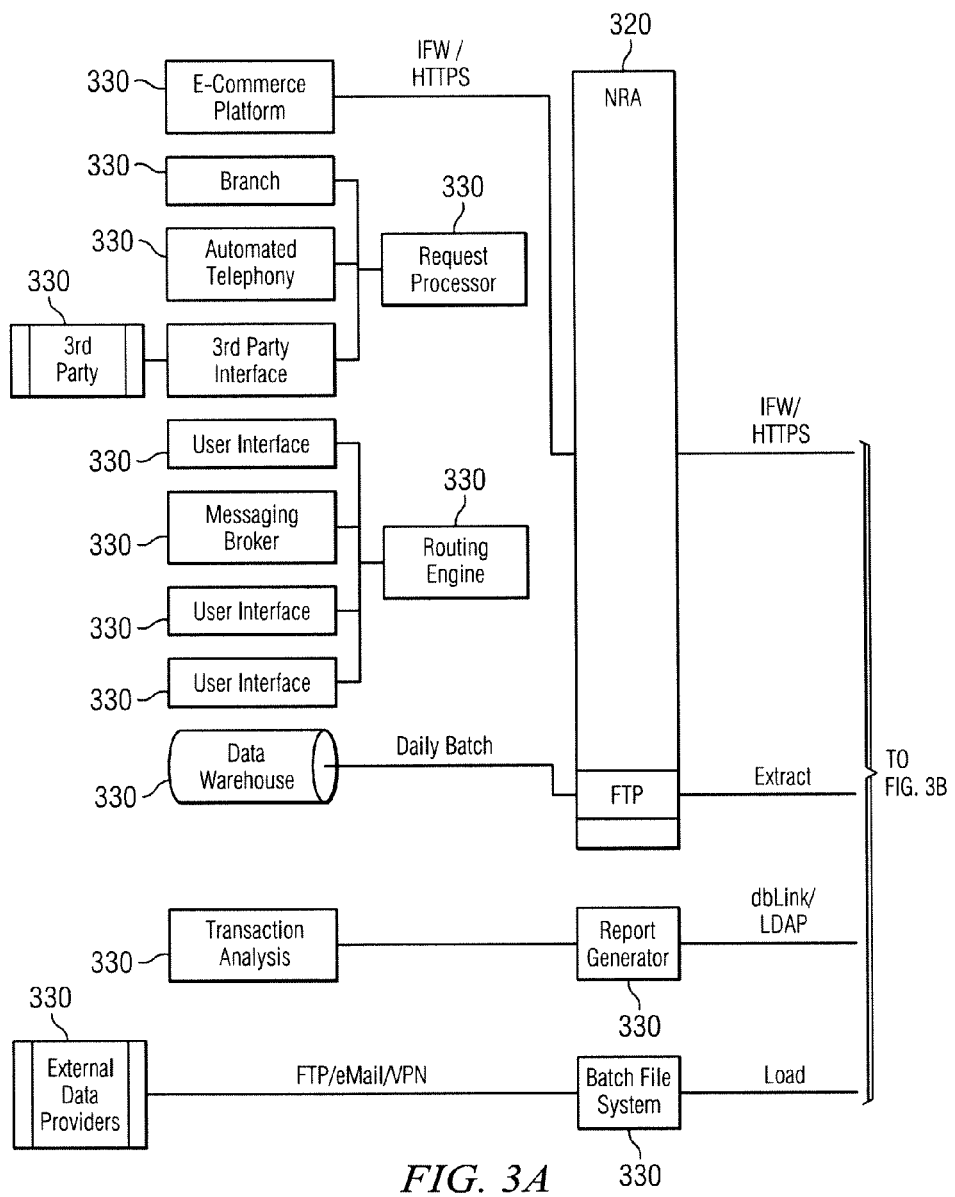
FIGS. 3A-B are block diagrams illustrating an embodiment of a platform for determining charges associated with electronic transactions and executing electronic transactions.
Figure 3B:
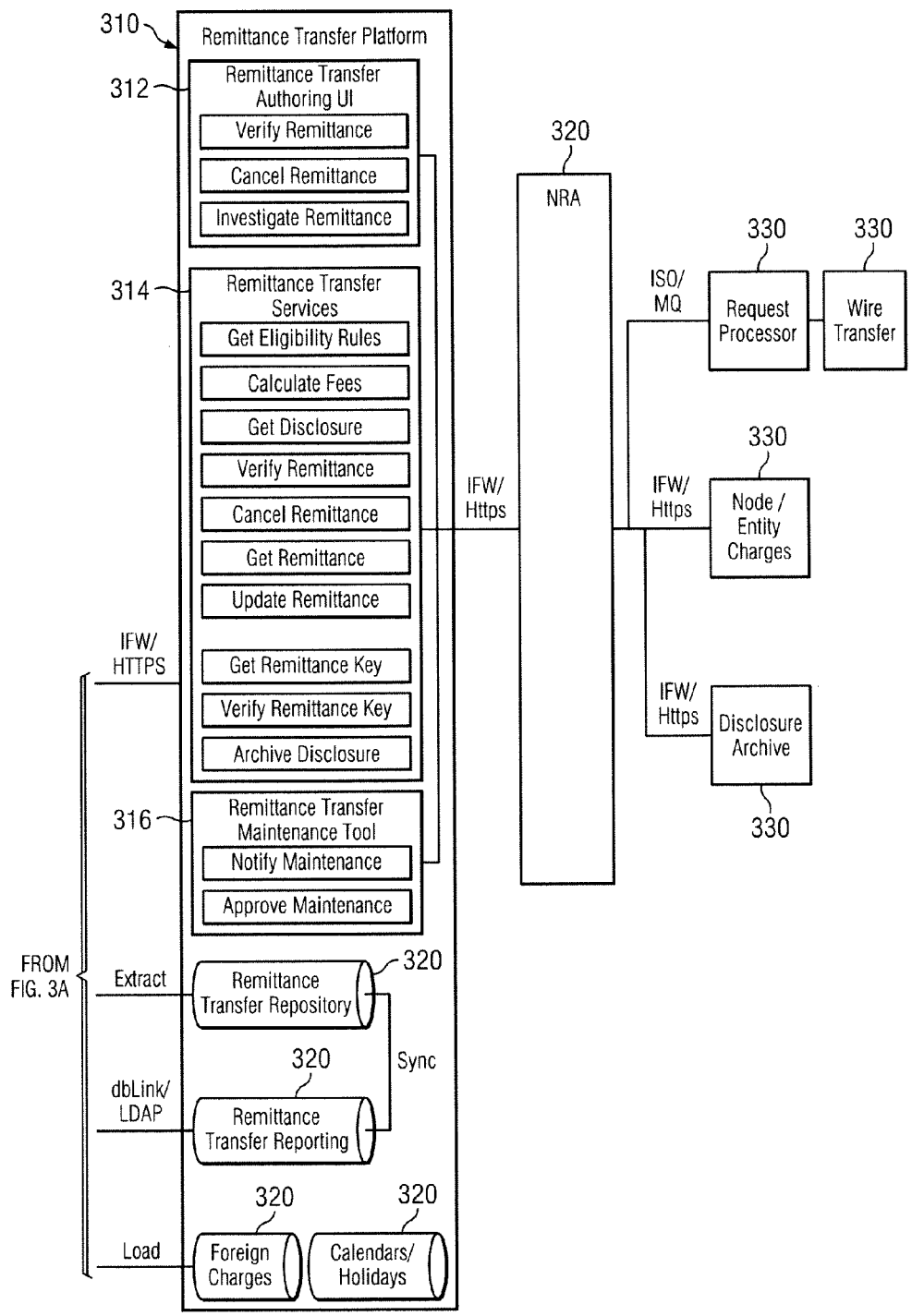

FIGS. 3A-B are block diagrams illustrating an embodiment of a platform for determining charges associated with electronic transactions and executing electronic transactions. Platform 300 includes remittance transfer platform 310 which is communicatively coupled to routing appliances 320, and a number of remittance transfer components 330.

Remittance transfer platform 310 includes remittance transfer user interface 312, remittance transfer services 314, remittance transfer maintenance services 316, and a number of databases 318. Remittance transfer user interface 312 provides an interface for users to access services such as remittance verification, remittance cancellation, and remittance investigation. Remittance transfer maintenance services 314 include determining remittance eligibility, charge calculation, transaction disclosure acquisition, remittance verification, remittance acquisition, remittance authorization key acquisition, remittance authorization key verification, and electronic transaction disclosure archiving. Remittance transfer maintenance 316 provides notification of necessary maintenance and approval of maintenance. Databases 318 provide electronic storage for data. Databases 318 include remittance transfer repository, remittance transfer report repository, foreign charges repository, and banking holiday repository. Network routing appliances 320 facilitate the routing of communications throughout system 300.

Remittance transfer components 330 interface with remittance transfer platform 310. For example, remittance transfer components 330 may include e-commerce platforms, branch locations, automated telephony services, third party enterprises, third party enterprise interfaces, electronic transaction request processors, client interfaces, message brokers, electronic transaction routing engines, data warehouses, transaction record analysis engines, transaction report generators, external data providers, batch file systems, transaction disclosure archives, charge archives, request processors, transaction execution mechanisms, legal/regulatory compliance, or any other suitable component.

Modifications, additions, or omissions may be made to system 300. System 300 may include more, fewer, or other components. Any suitable component of system 300 may include a processor, interface, logic, memory, or other suitable element.

Figure 4:
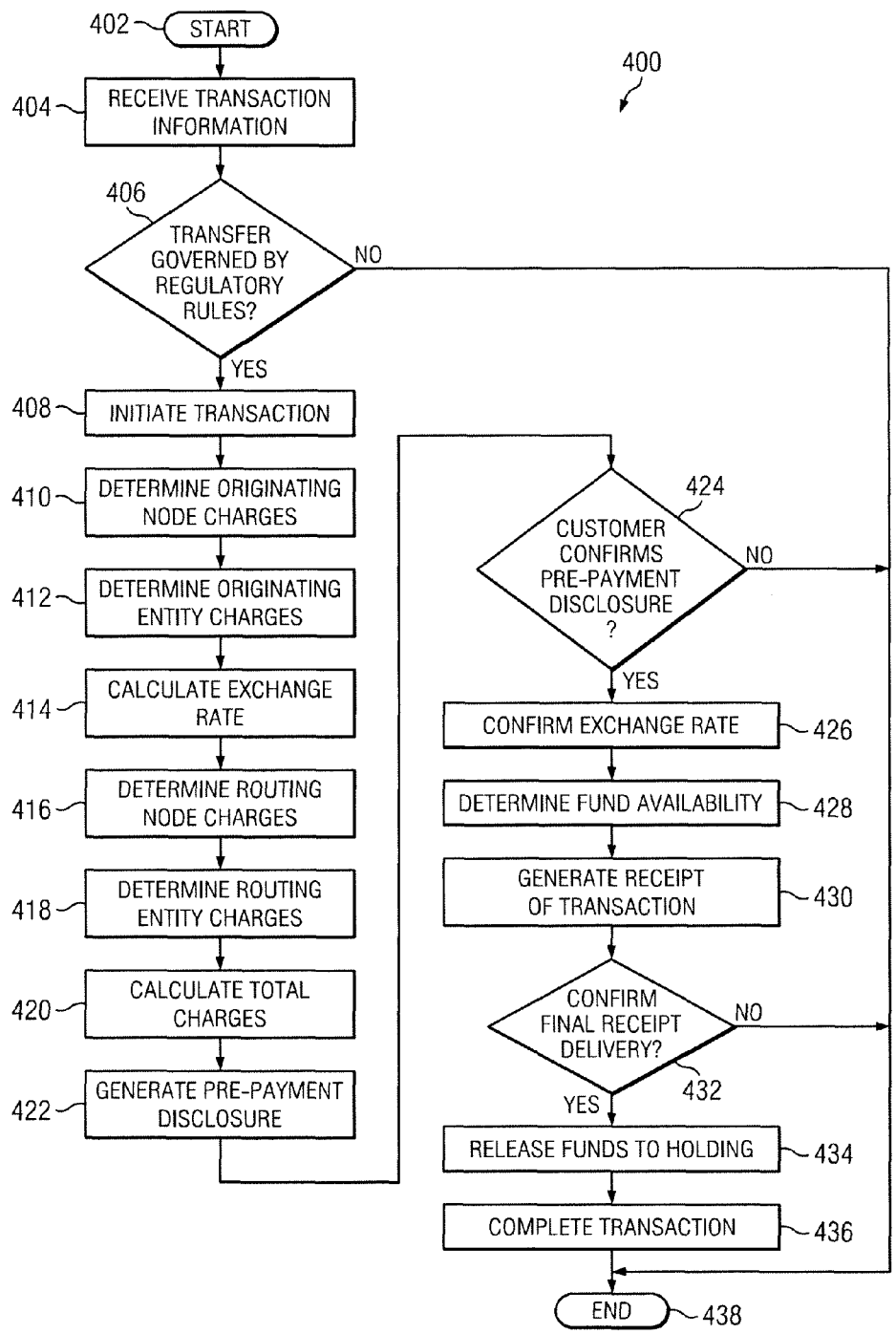
FIG. 4 is a flow chart of an embodiment of a method for determining charges associated with electronic transactions and executing electronic transactions.

FIG. 4 is a flow chart of an embodiment of a method for determining charges associated with an electronic transaction and executing the transaction. Method 400 begins at step 402. At step 404, information related to an electronic transaction (e.g., an electronic transaction representative of a currency amount) is received. In certain embodiments, information related to the electronic transaction is received through interfaces such as node service module 180, web portal 190, a user 192, or any other suitable interface. Information related to the electronic transaction may include information such as the currency amount represented by the transaction, the currency being transferred, the currency being received, the preferred language for documentation of the transaction, the identity of the transferor, the identity of the transferee, the identity of the transferor or transferee nodes 104, the transaction time of the electronic transaction, or any other suitable information.

At step 406, the information relating to the electronic transaction is analyzed to determine whether particular government regulations (e.g., the Dodd-Frank Act) apply to the electronic transaction. In certain embodiments, method 400 terminates unless an applicable government regulation requires it to continue (e.g., a requirement to provide a customer with the charges associated with the electronic transaction before executing the transaction). If applicable government regulations do not apply to the transaction, method 400 ends at step 438. If applicable government regulations apply to the transaction, method 400 continues to step 408 and the electronic transaction is initiated.

At step 410, the charges for the transferor node 104 are determined. At step 412, the charges for the transferor entity 106 are determined. At step 414, the exchange rate for the transaction is determined. At step 416, the charges associated with the electronic transaction for nodes 104 on the route of the electronic transaction are determined. At step 418, the charges associated with the electronic transaction for entities 106 on the route of the electronic transaction are determined. At step 420, the charges for the electronic transaction are calculated. At step 422, a pre-payment disclosure of the charges for the electronic transaction is generated. An example of a pre-payment disclosure is described in FIG. 5. At step 424, it is determined whether confirmation has been received that a user 194 has reviewed the pre-payment disclosure and approves the electronic transaction. If confirmation has not been received, the method ends at step 438. If confirmation has been received, the method continues to step 426 and the exchange rate is confirmed as still being accurate.

At step 428, a time when the electronic transaction will be completed is determined. At step 430, a receipt for the electronic transaction is generated. An example of a receipt is described below with respect to FIG. 6. At step 432, delivery of the receipt is verified. If the receipt has not been delivered, the method ends at step 438. If the receipt has been delivered, the method continues to step 434 and the funds for the transaction are released to holding. Funds may be held for an amount of time before completing the electronic transaction, for example, to allow the user 192 to terminate the electronic transaction. After funds have been held for an amount of time, the method continues to step 436 and the electronic transaction is completed. At step 438, method 400 ends.

Modifications, additions, or omissions may be made to method 400. The method may include more, fewer, or other steps. Additionally, steps may be performed in any suitable order. Any suitable component of may perform one or more steps of method 400.

Figure 5:
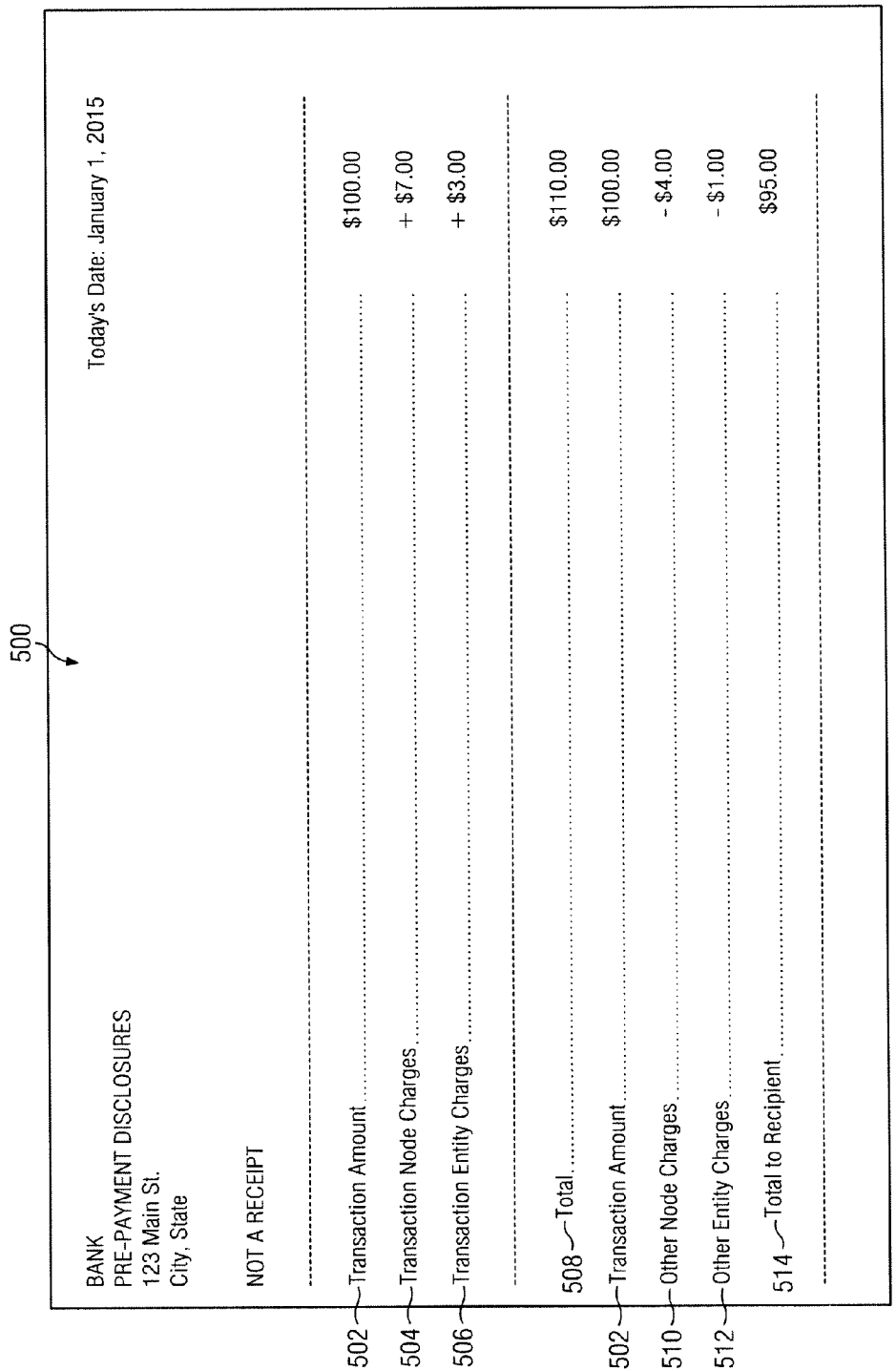
FIG. 5 illustrates an embodiment of a disclosure report of charges associated with an electronic transaction.

FIG. 5 illustrates an embodiment of a disclosure report of charges associated with an electronic transaction (e.g., an electronic transaction representative of a currency value). Report 500 represents a disclosure of the charges associated with an electronic transaction before the execution of the transaction. In the illustrated embodiment, report 500 discloses the charges associated with an international electronic transaction. Report 500 includes one or more of the following fields: transaction amount field 502, transferor node charges field 504, transferor entity charges field 506, total field 508, other node charges field 510, other entity charges field 512, and total to recipient field 514.

Transaction amount field 502 represents the currency amount sent by the transferor. Transferor node charges field 504 represents the charges applied by the transferor node 104 to execute the electronic transaction. Transferor entity charges field 506 represents the charges for the electronic transaction from the transferor entity 106. Total field 508 represents the total amount charged to the transferor by the transferor node 104 and transferor entity 106, and the currency value of the electronic transaction. In the illustrated embodiment, the transaction amount field 502 is $100.00 U.S. dollars (USD), the transferor node charges field 504 is $7.00 USD, the transferor entity charges field 506 is $3.00 USD, and the total field 506 is $110.00 USD ($100.00 USD transaction amount field 502+$7.00 USD transferor node charges field 504+$3.00 USD transferor entity charges field 506=$110.00 USD).

Other node charges field 510 represents the charges applied by nodes 104 on the route of the electronic transaction for executing the transaction. Other entity charges field 512 represents the charges applied by entities 106 on the route of the electronic transaction. Total to recipient field 514 represents the currency value that reaches the transferee after the transferring nodes 104 and entities 106 remove their respective charges. In the illustrated embodiment, the other node charges field 510 is $4.00 USD and the other entity charges field 512 is $1.00 USD. The total to the recipient field 514 is $95.00 USD ($100.00 USD−$4.00 USD other node charges field 510−$1.00 USD other entity charges field 512=$95.00 USD).

In certain embodiments, the report 500 is generated by calculation module 170 based on information received in a calculation request and information accessed from storage module 160. Report 500 may be predictive of charges and may not represent the actual charges that are applied during the electronic transaction. For example, a node 104 or entity 106 may change their charges and system 100 may not receive the changes. Government regulations may apply to report 500, and may require that the actual charges applied during the electronic transaction not deviate from report 500 by more than a threshold (e.g., 10%).

Modifications, additions, or omissions may be made to report 500. Report 500 may include additional information in additional fields, or may include less information and fewer fields. Report 500 may include any suitable information relating to an electronic transaction depicted in any suitable format.

FIG. 6 illustrates an embodiment of receipt of charges associated with an electronic transaction. Report 600 represents a receipt for an electronic transaction (e.g., an electronic transaction representative of a currency value) disclosing the charges that are being applied to the electronic transaction. In the illustrated embodiment, report 600 discloses the charges associated with an international electronic transaction. Report 600 includes the following fields: sender (transferor) contact information field 602, recipient (transferee) contact information field 604, pick-up location (transferee node) field 606, confirmation code field 608, date available field 610, transaction amount field 612, transferor node charges field 614, transferor entity charges field 616, total field 618, exchange rate field 620, transaction amount field 622, other node charges field 624, other node charges field 626, and total to recipient field 628.

Sender contact information field 602 represents contact information for the sender (transferor) of funds. Recipient contact information field 604 represents contact information for the recipient (transferee) of an electronic transaction. Pick-up location (transferee node) field 606 represents contact information for the node 104 that receives the electronic transaction (e.g., receives funds) for the recipient (transferee). Sender contact information field 602, recipient contact information field 604, and pick-up location field 606 may include address, phone number, email address, or any other suitable contact information.

Confirmation code field 608 represents an identifier for the electronic transaction. Date available field 610 represents the date that the electronic transaction will be completed (e.g., funds will be available for the transferee at the transferee node 104). Transaction amount field 612 represents the currency amount a transferor sends to a transferee. Transferor node charges field 614 represents the charges applied by the transferor node 104 to execute the electronic transaction. Transferor entity charges field 616 represents the applicable charges applied to the electronic transaction by the transferor entity 106. Total field 618 represents the total amount charged to the transferor and the currency value of the electronic transaction.

In the illustrated embodiment, the transaction amount field 612 is $100.00 USD, the transferor charges field 614 from the transferor node are $7.00 USD, the transferor entity charges field 616 from the transferor entity 106 are $3.00 USD, and the total field 618 charged to the transferor is $110.00 USD ($100.00 USD transaction amount 612+$7.00 USD transferor node charges 614+$3.00 USD transferor entity charges 616=$110.00 USD).

Exchange rate field 618 represents the exchange rate for the currency conversion in the electronic transaction. In the illustrated embodiment, the exchange rate field 618 for the electronic transaction is $1.00 USD to 12.34 XXN (example currency). Transaction amount field 622 represents the transaction amount field 612 after applying the exchange rate to the transaction amount field 612. In the illustrated embodiment, transaction amount field 612 is $100.00, the exchange rate field 620 is $1.00 USD to 12.34 XXN, and the transaction amount field 622 is 1,234 XXN ($100 USD×(12.34 XXN/USD)=1,234 XXN). Other node charges field 624 represents the charges, in the destination currency (e.g., XXN), applied by nodes 104 on the route of the electronic transaction for servicing the transaction. Other entity charges field 626 represents the charges, in the destination currency (e.g., XXN), applied by entities 106 on the route of the electronic transaction. Total to recipient field 628 represents the currency value, in the destination currency (e.g., XXN), that reaches the transferee after the transferring nodes 104 and entities 106 remove their respective charges.

In the illustrated embodiment, the transaction amount field 622 is 1,234 XXN, other node charges field 624 is 49.00 XXN, and other entity charges field 626 is 12.00 XXN. In the illustrated embodiment, other node charges field 624 and other entity charges field 626 closely align with the predicted other node charges field 510 ($4.00 USD×(12.34 XXN/USD) =49.36 XXN) and other entity charges field 512 ($1.00 USD× (12.34 XXN/USD)=12.34 XXN) from FIG. 5. Differences between report 500 and report 600 can occur because of any number of reasons, for example, changes in exchange rate, charges, inaccurate information used to generate report 500, or other reason. In the illustrated embodiment, total to recipient field 628 is 1,173.00 XXN (1,234 XXN transaction amount field 622−49.00 XXN other node charges field 624− 12.00 XXN other entity charges field 626=1,173 XXN).

Modifications, additions, or omissions may be made to report 600. Report 600 may include additional information in additional fields, or may include less information and fewer fields. Report 600 may include any suitable information relating to an electronic transaction depicted in any suitable format.

FIG. 7 is a table illustrating an embodiment of database fields that may be used in determining charges associated with electronic transactions. In the illustrated embodiment, table 700 includes transaction identifier field 702, transaction amount field 704, transaction destination field 706, bank identifier field 708, bank location field 710, bank charge identifier field 712, bank charge amount field 714, bank charge rating field 716, country charge identifier field 718, country charge field 720, and country charge rating field 722.

Transaction identifier field 702 represents an identifier for a particular electronic transaction. Transaction amount field 704 represents the currency value represented by the electronic transaction. Transaction destination field 706 represents the geographic location of the transferee node 104. Bank identifier field 708 represents an identifier for a bank (node 104). Bank location field 710 represents the country (entity 106) of the bank (node 104) identified in field 708. Bank charge identifier field 712 represents an identifier for the charge the bank (node 104) from field 708 charges for the transaction identified in field 702. Bank charge amount field 714 represents the amount of the charge identified in field 712. Bank charge rating 716 represents the rating applied to the charge identified in field 712. Country charge identifier field 718 represents an identifier of a charge applied by the country (entity 106) identified in field 710 for the electronic transaction identified in field 702. Country charge field 720 represents the amount of the charge identified in field 718. Country charge rating 722 represents the rating applied to the charge identified in field 718.

In the illustrated embodiment, table 700 includes four examples of information stored in table 700 relating to two fund transfers. Rows 724 and 726 relate to a first electronic transaction identified by transaction ID 01-AB-23-CD. The first electronic transaction has a currency value of $100.00 USD and has a destination of Nice, France. The first transaction routes through banks (nodes 104) identified by ABC123 and DEF456, both located in France. The bank (node 104) identified as ABC123 applies charge YZ-6789 to service electronic transaction 01-AB-23-CD and there is a rating of "normal" applied to charge YZ-6789. The charge amount for charge YZ-6789 for electronic transaction 01-AB-23-CD is $3.00 USD. In the illustrated embodiment, France (entity 106) applies charge 5R7V of $0.50 for electronic transaction 01-AB-23-CD, and there is a rating of "high" applied to charge 5R7V. Bank (node 104) DEF456 applies charge GH-7654 to service electronic transaction 01-AB-23-CD and there is a rating of "low" applied to charge GH-7654. The charge amount for charge GH-7654 for electronic transaction 01-AB-23-CD is $1.00 USD. In the illustrated embodiment, France applies charge 5R7V of $0.50 for electronic transaction 01-AB-23-CD, and there is a rating of "high" applied to charge 5R7V.

Rows 728 and 730 relate to the second electronic transaction identified by transaction ID 67-OP-89-QR. The second electronic transaction has a currency value of $500.00 USD and has a destination of Beijing, China. In the second transaction, 67-OP-89-QR routes through bank (node 104) identified by GHI789, located in Canada, and JKL321, located in China. Bank (node 104) GHI789 charges QR-4321 to service electronic transaction 67-OP-89-QR and there is a rating of "high" applied to charge QR-4321. The amount of charge QR-4321 for electronic transaction 67-OP-89-QR is $2.00 USD. In the illustrated embodiment, Canada applies charge 3P1A of $0.75 for electronic transaction 67-OP-89-QR, and there is a rating of "high" applied to charge 3P1A. Bank (node 104) JKL321 applies charge ST-2468 to service electronic transaction 67-OP-89-QR and there is a rating of "no confidence" applied to charge ST-2468. The amount for charge ST-2468 for electronic transaction 67-OP-89-QR is $5.00 USD. In the illustrated embodiment, China applies charge 2G6B of $1.00 for electronic transaction 67-OP-89-QR, and there is a rating of "low" applied to charge 2G6B.

Modifications, additions, or omissions may be made to table 700. Table 700 may include more or less fields, and may include any information relevant to electronic transactions or determining charges associated with electronic transactions. Table 700 may include any suitable amount of information and may be stored in any suitable type or number of memories. In an embodiment, table 700 may also include data expiration dates or data effective dates.

Figure 8:
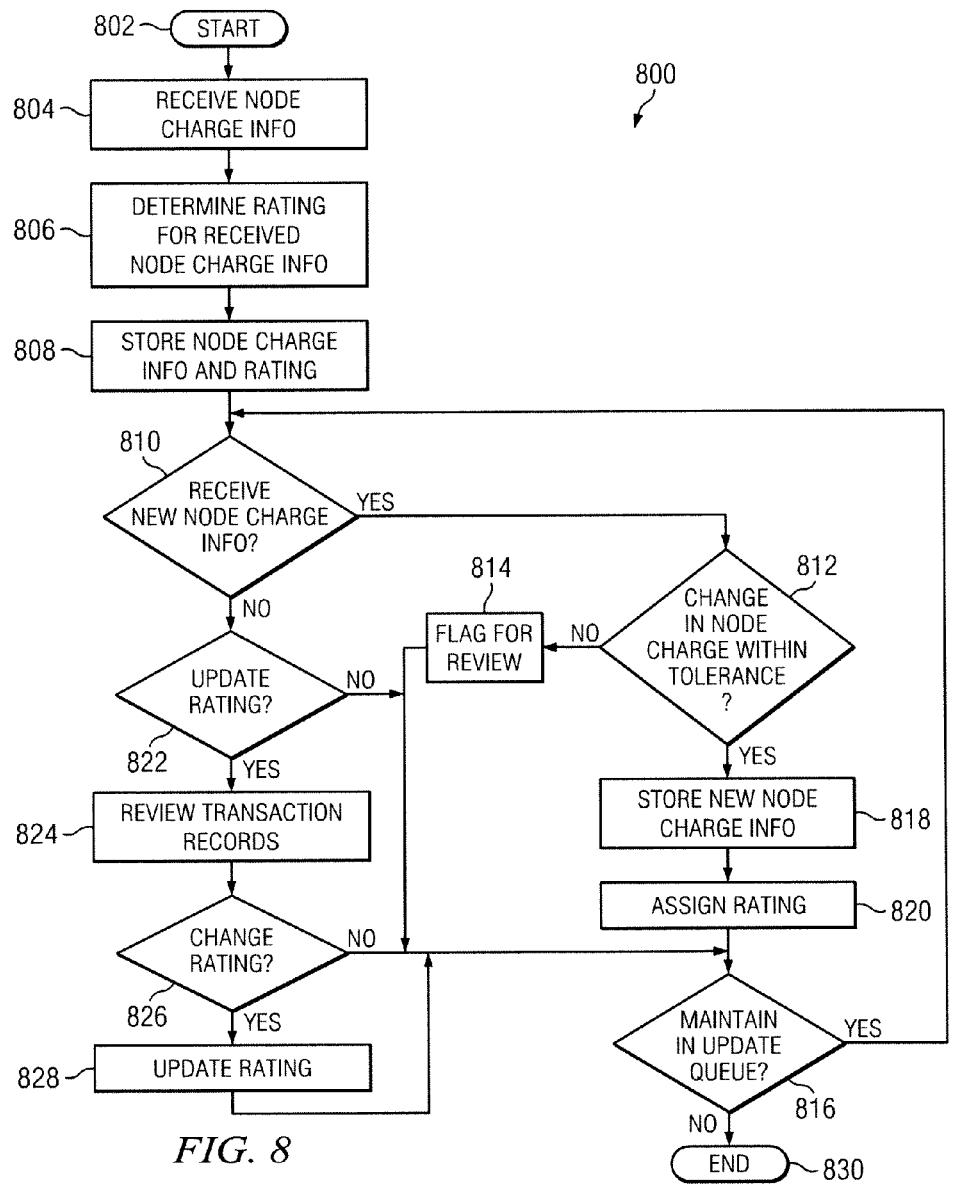
FIG. 8 is a flow chart of an embodiment of a method for maintaining ratings of charge information associated with electronic transactions.

FIG. 8 is a flow chart of an embodiment of a method for maintaining ratings of charge information associated with electronic transactions. Method 800 begins at step 802. At step 804, system 100 receives charge information for a node 104 associated with electronic transactions. At step 806, system 100 determines a rating for the received charge information. At step 808, system 100 stores the charge information and corresponding rating. At step 810, system 100 determines whether it has received new charge information that would update stored charge information.

If new charge information has been received, system 100 determines at step 812 whether the change from the stored charge information to the new charge information is within a tolerance level. A tolerance level may apply to a charge, a class of charges, a node 104, a class of nodes 104, an entity 106, a class of entities 106, or any other suitable category. If the change is not within the tolerance level, system 100 may flag the new information for review at step 814. In certain embodiments, system 100 may attempt to verify flagged charge information or disregard the flagged charge information. After the information is flagged, system 100 determines at step 816 whether to maintain the stored charge information in an update queue that regularly checks for new charge information. If system 100 determines not to maintain the charge information in the update queue, the method ends at step 830. If system 100 determines to maintain the charge information in the update queue, then the method moves back to step 810 and system 100 determines whether it has received new charge information.

If the new charge information is within the tolerance level, system 100 stores the new charge information at step 818. In certain embodiments, the new charge information replaces the existing charge information in a database. At step 820, system 100 assigns the new charge information a rating, then moves to step 816 to determine whether to maintain the charge information in the update queue. If no new charge information is received, system 100 determines whether to update the rating for the stored charge information at step 822. If system 100 determines not update the rating for the stored charge information, the method goes to step 816 and system 100 determines whether to maintain the charge information in the update queue. If system 100 determines to update the rating for the charge information, the method moves to step 824 and system 100 reviews electronic transaction records associated with the charge. The electronic transaction records may relate to a charge, a class of charges, a node 104, a class of nodes 104, an entity 106, a class of entities 106, or any other suitable category. For example, the electronic transaction records may include records for similar electronic transactions involving the same or similar nodes 104. System 100 can evaluate the reliability of the charge information by checking it against the electronic transaction records.

At step 826, system 100 determines whether to change the rating for the charge information based on the transaction records. System 100 may upgrade the rating if the transaction records indicate that the charge information is accurate within a first tolerance level, may downgrade the rating if the charge information is not within a second tolerance level, or may keep the rating the same if the charge information is reliable within a third tolerance level. If system 100 changes the rating, the method moves to step 828 and system 100 changes the rating, then moves to step 816 to determine whether to maintain the charge information in the update queue. If system 100 does not change the rating, the method moves to step 816 to determine whether to maintain the charge information in the update queue.

Modifications, additions, or omissions may be made to method 800. The method may include more, fewer, or other steps. Additionally, steps may be performed in any suitable order. Any suitable component of system 100 may perform one or more steps of method 800. In certain embodiments, method 800 may also be used to update entity 106 charge information.

Certain embodiments of the present disclosure may provide some, none, or all of the following technical advantages having specific technical effects.

In certain embodiments, nodes involved in electronic transactions can determine costs associated with an electronic transaction before executing the transaction, thereby conserving the computational resources and bandwidth consumed by determining costs associated with transactions by executing and storing the results of numerous transactions.

In another embodiment, nodes involved in electronic transactions can obtain charge information associated with electronic transactions for a plurality of nodes and store the charge information in a centralized database before receiving a request to execute an electronic transaction, thereby reducing the computation resources and bandwidth consumed by attempting to obtain charge information from remote sources through a burst of requests after receiving a request to execute an electronic transaction.

In yet another embodiment, nodes involved in electronic transactions can reduce transaction time associated with an electronic transaction by routing the transaction through nodes with the lowest transaction time, thereby reducing the computational resources and bandwidth consumed routing the transaction through nodes with longer transaction times.

In still yet another embodiment, nodes involved in electronic transactions can increase the efficiency of the electronic transaction by routing the transaction on a route with the least number of nodes, thereby conserving the bandwidth and computational resources consumed by routes using more nodes.

In another embodiment, nodes involved in electronic transactions can increase the efficiency of the electronic transaction by routing the transaction on a route with lowest transaction cost, thereby conserving the bandwidth and computational resources consumed by attempting transactions to determine their cost.

In yet another embodiment, nodes involved in electronic transactions can increase the efficiency of electronic transactions by maintaining updated charge information for nodes in order to avoid routing the transaction through nodes with inaccurate charge information, thereby conserving the computational resources and bandwidth consumed reconciling inaccuracies after a transaction has occurred (e.g., through customer service claims investigation).

Certain embodiments of the present disclosure may include some, all, or none of the above advantages. One or more other technical advantages may be readily apparent to those skilled in the art from the figures, descriptions, and claims included herein.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system for calculating a cost for an electronic transaction, comprising:
one or more processors operable to:
receive first charge information associated with electronic transactions for a plurality of nodes;
determine a plurality of first charge ratings for the first charge information;
receive second charge information associated with electronic transactions for a plurality of entities, wherein each entity has authority over one or more of the nodes; and
determine a plurality of second charge ratings for the second charge information;
one or more memories communicatively coupled to at least one of the one or more processors, the one or more memories operable to:
store the first charge information and the first charge ratings; and
store the second charge information and the second ratings; and the one or more processors further operable to:
receive a request to execute an electronic transaction;
determine a route for the electronic transaction, wherein the route includes two or more of the nodes and two or more of the entities, and wherein one or more first charge ratings associated with the two or more nodes is above a first threshold and one or more second charge ratings associated with the two or more entities is above a second threshold;
determine first charge information applicable to the electronic transaction for the two or more nodes on the route;
determine second charge information applicable to the electronic transaction for the two or more entities on the route;
calculate a cost for the electronic transaction based at least in part on the first charge information for the nodes on the route and the second charge information for the entities on the route;
generate a report of the cost for the electronic transaction; and
execute the electronic transaction.

2. A system for calculating a cost for an electronic transaction, comprising:
one or more processors operable to receive first charge information associated with electronic transactions for a plurality of nodes;
one or more memories operable to store the first charge information; and
the one or more processors further operable to:
receive a request to execute an electronic transaction;
determine a route for the electronic transaction comprising two or more of the nodes;
determine first charge information applicable to the electronic transaction for the two or more nodes;
calculate a cost for the electronic transaction based at least in part on the first charge information for the two or more nodes on the route;
receive new first charge information associated with electronic transactions for at least one of the plurality of nodes;
determine a change from stored first charge information to the new first charge information;
determine whether the change is within a tolerance level; and
update the stored first charge information with the new first charge information if the change is within the tolerance level.

3. The system of claim 2, the one or more processors further operable to:
determine a plurality of first ratings for the first charge information; and
receive a plurality of transaction records relating to electronic transactions involving one or more of the plurality of nodes;
the one or more memories further operable to:
store the plurality of first ratings; and
store the plurality of transaction records; and
the one or more processors further operable to change one or more of the plurality of first ratings based on the transaction records.

4. The system of claim 3, wherein a node is included in the route only if one or more first ratings associated with the node are above a threshold.

5. The system of claim 2, the one or more processors further operable to:

receive second charge information associated with electronic transactions for a plurality of entities;
the one or more memories further operable to store the second charge information; and
the one or more processors further operable to determine second charge information applicable to the electronic transaction for the entities on the route, wherein calculating the cost for the electronic transaction is also based at least in part on the second charge information applicable to the electronic transaction for the entities on the route.

6. The system of claim 2, the one or more processors further operable to:
receive a plurality of transaction records relating to electronic transactions involving one or more of the nodes, wherein the transaction records include transaction time information associated with the amount of time it took the one or more nodes to execute at least one electronic transaction; and
the one or more memories further operable to store the transaction records, wherein the route is determined based at least in part on the transaction time information.

7. The system of claim 2, wherein the route is determined based at least in part on at least one from the set comprising: first charge information applicable to the electronic transaction for at least one of the plurality of nodes and transaction records relating to electronic transaction involving at least one of the plurality of nodes, wherein the transaction records include transaction time information associated with the amount of time it took at least one of the plurality of nodes to execute at least one electronic transaction.

8. A non-transitory computer readable storage medium comprising logic, for calculating a cost for an electronic transaction, the logic operable, when executed by a processor, to:
receive first charge information associated with electronic transactions for a plurality of nodes;
store the first charge information;
receive a request to execute an electronic transaction;
determine a route for the electronic transaction comprising two or more of the nodes;
determine first charge information applicable to the electronic transaction for the two or more nodes;
calculate a cost for the electronic transaction based at least in part on the first charge information for the two or more nodes on the route;
receive new first charge information associated with electronic transactions for at least one of the plurality of nodes;
determine a change from stored first charge information to the new first charge information;
determine whether the change is within a tolerance level; and
update the stored first charge information with the new first charge information if the change is within the tolerance level.

9. The non-transitory computer readable storage medium of claim 8, the logic further operable to:
determine a plurality of first ratings for the first charge information;
store the plurality of first ratings;
receive a plurality of transaction records relating to electronic transactions involving one or more of the plurality of nodes;
store the plurality of transaction records; and
change one or more of the plurality of first ratings based on the transaction records.

10. The non-transitory computer readable storage medium of claim 9, wherein a node is included in the route only if one or more first ratings associated with the node are above a threshold.

11. The non-transitory computer readable storage medium of claim 8, the logic further operable to:
receive second charge information associated with electronic transactions for a plurality of entities;
store the second charge information; and
determine second charge information applicable to the electronic transaction for the countries on the route, wherein calculating the cost for the electronic transaction is also based at least in part on the second charge information applicable to the electronic transaction for the entities on the route.

12. The non-transitory computer readable storage medium of claim 8, the logic further operable to:
receive a plurality of transaction records relating to electronic transactions involving one or more of the nodes, wherein the transaction records include transaction time information associated with the amount of time it took the one or more nodes to execute at least one electronic transaction; and
store the transaction records, wherein the route is determined based at least in part on the transaction time information.

13. The non-transitory computer readable storage medium of claim 8, wherein the route is determined based at least in part on at least one from the set comprising: first charge information applicable to the electronic transaction for at least one of the plurality of nodes and transaction records relating to electronic transactions involving at least one of the plurality of nodes, wherein the transaction records include transaction time information associated with the amount of time it took at least one of the plurality of nodes to execute at least one electronic transaction.

14. A method for calculating a cost for an electronic transaction, comprising:
receiving first charge information associated with electronic transactions for a plurality of nodes;
storing the first charge information in one or more memories;
receiving a request to execute an electronic transaction;
determining, by one or more processors, a route for the electronic transaction comprising two or more of the nodes;
determining, by at least one of the one or more processors, first charge information applicable to the electronic transaction for the nodes on the route;
calculating, by at least one of the one or more processors, a cost for the electronic transaction based at least in part on the first charge information applicable to the electronic transaction for the two or more nodes on the routes;
receiving new first charge information associated with electronic transactions for at least one of the plurality of nodes;
determining, by at least one of the one or more processors, a change from the stored first charge information to the new first charge information;
determining, by at least one of the one or more processors, whether the change is within a tolerance level; and
updating, by at least one of the one or more processors, the stored first charge information with the new first charge information if the change is within the tolerance level.

15. The method of claim 14, further comprising:
  determining, by at least one of the one or more processors, a plurality of first charge ratings for the first charge information;
  storing the plurality of first charge ratings in at least one of the one or more memories;
  receiving a plurality of transaction records relating to electronic transactions involving one or more the nodes;
  storing the plurality of transaction records in at least one of the one or more memories; and
  changing, by at least one of the one or more processors, one or more of the plurality of first charge ratings based on the transaction records.

16. The method of claim 15, wherein a node is included in the route only if one or more first charge ratings associated with the node are above a threshold.

17. The method of claim 14, further comprising:
  receiving second charge information associated with electronic transactions for a plurality of entities;
  storing the second charge information in at least one of the one or more memories; and
  determining, by at least one of the one or more processors, second charge information applicable to the electronic transaction for the entities on the transaction route, wherein the calculating a cost for the electronic transaction is also based at least in part on the second charge information applicable to the electronic transaction for the entities on the route.

18. The method of claim 14, further comprising:
  receiving a plurality of transaction records relating to electronic transactions involving one or more of the nodes, wherein the transaction records include transaction time information associated with the amount of time it took the one or more nodes to execute at least one electronic transaction; and
  storing the transaction records, wherein the route is determined based at least in part on the transaction time information.

19. The method of claim 14, wherein the route is determined based at least in part on at least one from the set comprising: first charge information applicable to the electronic transaction for at least one of the plurality of nodes and transaction records relating to electronic transactions involving at least one of the plurality of nodes, wherein the transaction records include transaction time information associated with the amount of time it took at least one of the plurality of nodes to execute at least one electronic transaction.

* * * * *